Oct. 22, 1968      R. F. MICHAEL      3,406,560
METHOD AND APPARATUS FOR COMPENSATING MARINE COMPASSES
Filed March 15, 1965      2 Sheets-Sheet 1
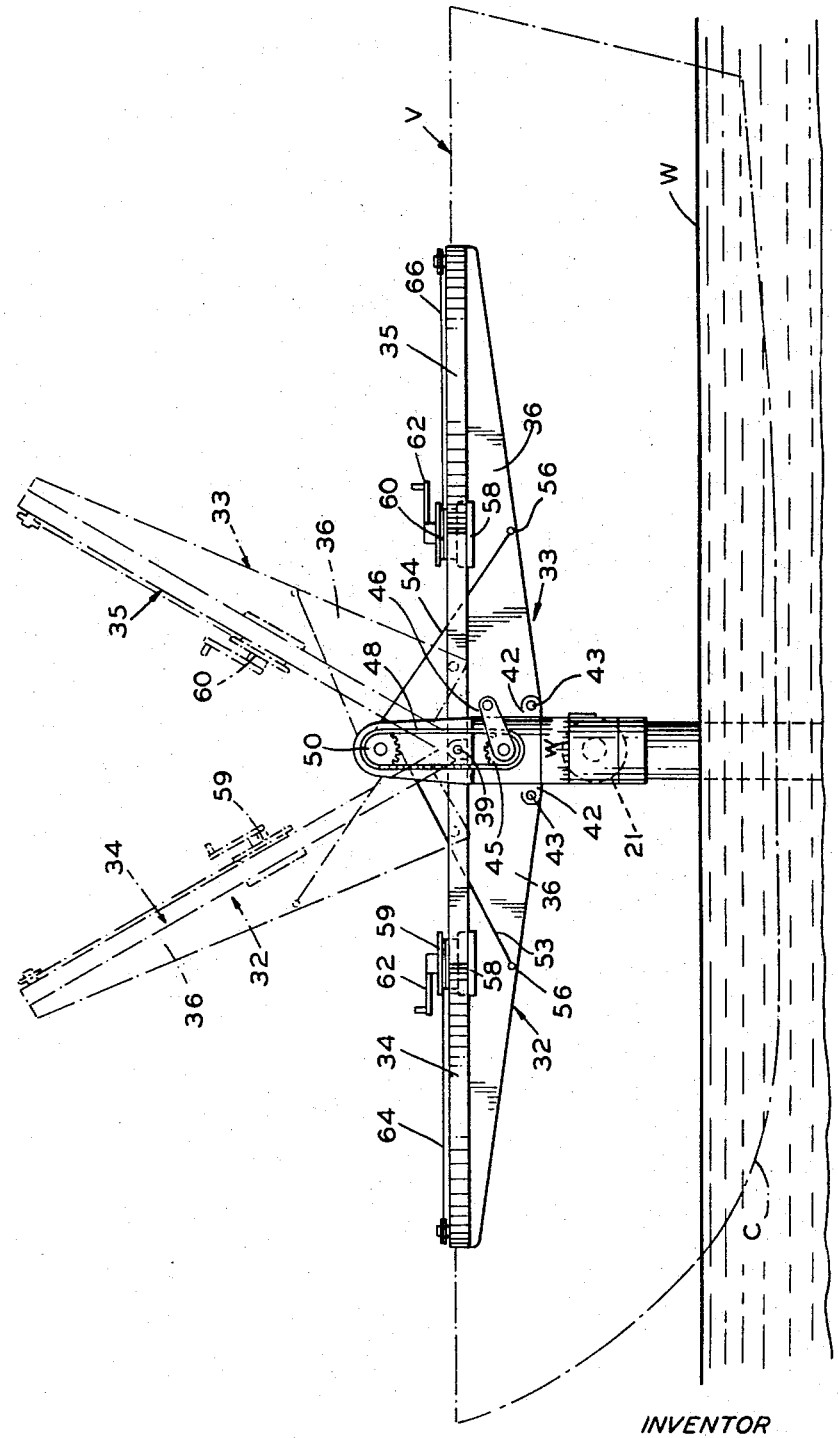
INVENTOR
RAYMOND F. MICHAEL
BY
ATTORNEYS

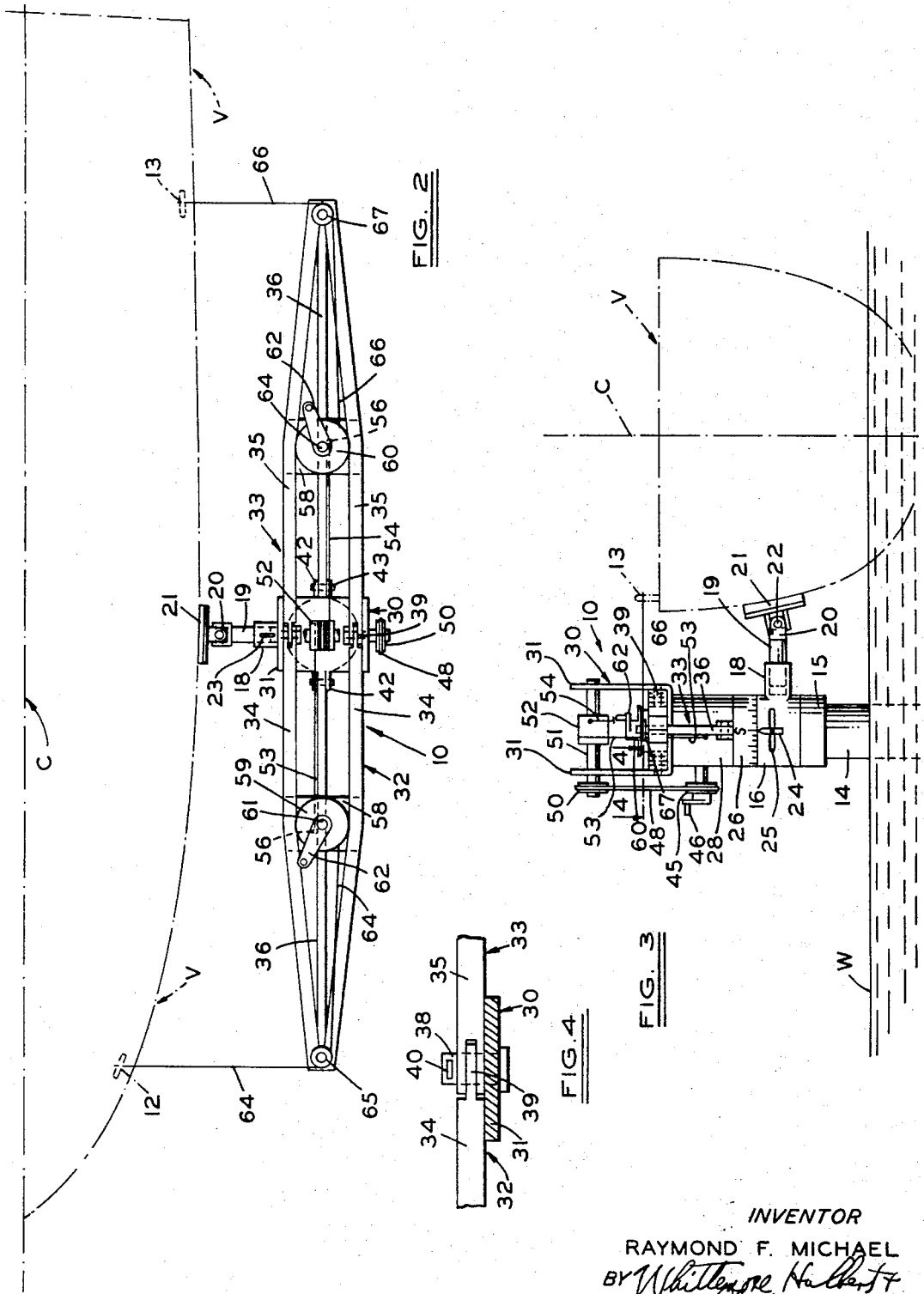

United States Patent Office 3,406,560
Patented Oct. 22, 1968

3,406,560
METHOD AND APPARATUS FOR COMPENSATING
MARINE COMPASSES
Raymond F. Michael, 4153 Yorkshire,
Detroit, Mich. 48224
Filed Mar. 15, 1965, Ser. No. 439,580
5 Claims. (Cl. 73—1)

ABSTRACT OF THE DISCLOSURE

A method and apparatus for the calibrating and determining the magnetic deviation of marine compasses. The marine craft on which the compass is mounted is tethered to a part of a structure pivoted to swing horizontally about an upright pile or post. The tethering is accomplished by cables to for and aft points on the craft so as to bring the keel line parallel to the center line of the elongated pivoted structure. After being tethered the craft is pointed in a known azimuth direction, an adjustable indicator of the swingable compensating structure is set to indicate the known direction, and the craft is then swung progressively employing its own power so that observation of true azimuth can be made as the craft is swung and compared with readings of a compass on the craft.

---

The present invention relates to an improved method and to apparatus for compensating marine compasses, enabling this operation to be performed with a high degree of accuracy in a short period of time and with little effort. The improved procedure and equipment have the objective of substituting for the time-honored and tedious operation of compensating the compass of a craft in open water, subject as it is to unpredictable and adverse weather and wind conditions, and the like, a method which is extremely simple and easy of performance, using apparatus which is compact and equally simple, but altogether reliable and accurate in the result it affords.

In general, the improved method involves the accurate positioning and tethering of the floating craft in relation to an improved compensation frame structure or assembly, by means of which the craft may be progressively swung later in making the desired compensating or correctional checks at an appropriate number of compass directional points. In tethering the boat provisions are made to enable the owner or operator, in a convenient and quick way, to align the keel in parallelism with the longitudinal centerline of elongated, horizontally extending arms of the compensating frame assembly, and to in turn align the keel centerline (or that of the frame arms, if desired) with a known magnetic compass sighting or reference point. The operator then adjusts and sets certain azimuth indicator means of the equipment to show this known compass sighting direction, whereupon he proceeds to compensate the vessel's compass, using the craft's own power and rudder means, by moving the vessel progressively 360° around the compass, at selected points of which deviations of the vessel's compass from true accuracy are individually noted. This is done by direct reference to the azimuth indicator means of the equipment mentioned above.

In accordance with the apparatus aspect of the invention, it involves the provision of an upright pile structure driven into a suitable area of a marina or like facility which will permit a sufficient diameter of 360° horizontal turn about the pile to accommodate the craft employing the marina facilities. The pile rotatably supports a tethering and compensating frame structure, and also has associated therewith a fixed azimuth indicator, suitably elevated above the water line, as well as an adjacent, horizontally rotatable indicator or pointer, which rotates with the frame and craft. The pointer is adapted to be adjusted angularly relative to and set to coact with the azimuth member, once the tethered craft has had its forward-aft centerline aligned or paralleled with the known compass sighting direction, so that the pointer thereafter indicates on the fixed azimuth member the compass directions through which the frame structure and its tethered craft are swung in compensating. As indicated above, this last is done using the power of the boat and its rudder.

More specifically, the frame structure of the apparatus comprises a pair of elongated and diametrically oppositely aligned horizontal arms, which arms are pivoted, for a purpose to be described, on a common horizontal axis by a bracket unit of the structure, rotatable about the upright mounting pile adjacent the top of the latter. The arms, as employed in tethering and swinging the boat, each have associated therewith, at predetermined points a bit radially outward of their pivot axis, a manually operable cable drum, from which drums steel cables extend radially outwardly, forward and aft, about pulleys adjacent the outer ends of the arms, whence the cables are adapted to be connected to cleats on the near gunwale of the vessel, adjacent the prow and stern of the latter, respectively.

Thus, an operator, standing at the center of the craft between the cable drums, may conveniently operate the same to tighten and loosen the cables as necessary in drawing the keel centerline of the vessel parallel with the longitudinal centerline of the tethering arms, which parallelism may then be preserved by locking the cable drums against retrograde rotation, as by appropriate reel or drum brake means, pawl and ratchet means, or the like.

The keel line is then set in alignment with a more or less distant known magnetic compass sighting point, well forward of the boat prow, whereupon a pointer, adjustable on a coupling sleeve rotatable with the craft and frame structure, is set to the sleeve to indicate on the fixed azimuth member or ring this known magnetic direction. The equipment is then in condition for progressive readings of the compass of the vessel at directions calibrated on the azimuth ring.

A further improvement in accordance with the invention resides in the fact that the tethering and compensating structure, as mounted for rotation about an upright axis represented by the axis of the mounting pile member, has provisions for disposing the same in a compact, inoperative position, as between uses, overnight, or in the winter. This is made possible by the pivotal mounting of the frame arms on a common horizontal axis provided by an upper bracket rotatable with the frame structure as referred to above, enabling the arms to be swung upwardly towards or to a compact vertical retract position when the apparatus is not in use.

Thus in accordance with the invention mentioned the frame structure bracket is provided with a manually operable cable drum and flexible cables secured to the drum and extending to connections with the frame arms located radially outwardly of the horizontal pivot about which the arms are swingable to the retract position. The drum is manually operable by centrally located releasably lockable chain and sprocket means, for the cable raising and lowering of the arms to and from the retract position, at which the installation occupies a minimum of projected area. The equipment thus does not subtract significantly from the area available for other normal marina use.

The foregoing as well as other objects will become more apparent as this description proceeds, especially when considered in connection with the accompanying drawings illustrating the invention, wherein:

FIG. 1 is a side elevational view, schematic in nature, illustrating the marine compass compensating apparatus of the present invention in relation to a floating craft tethered thereby, the tethering and compensating frame structure being respectively shown in solid and dot-dash line in the operative position and in the upwardly swung, inoperative position of its arms;

FIG. 2 is a top plan view of the installation, showing the manner of tethering and aligning the craft (dot-dash line in all figures) to the apparatus;

FIG. 3 is an end elevation, as from the stern end of the vessel; and

FIGURE 4 is a fragmentary enlarged scale view in horizontal section on line 4—4 of FIG. 3, illustrating a suitable common pivotal connection of the vertically swingable arms of the frame structure.

As depicted in FIGS. 1, 2 and 3 of the drawings, the compensating apparatus of the present invention is generally designated by the reference numeral 10, these views showing an engine-powered marine craft or vessel V operatively tethered thereto. It is to be understood that the vessel fixedly carries a marine compass (not shown) to be compensated in accordance with the invention. The centerline of the keel of the vessel is designated by the reference character C, and the craft is provided, starboard and/or port, and adjacent its prow and stern with a pair of gunwale cleats 12, 13, respectively, for a purpose to be described.

The apparatus 10 comprises a rigid and sturdy upright mounting post 14, as in the form of a pile driven firmly to a suitable depth in the bottom of a marina or other marine service area, at which the water level is designated W. The size of this area should be sufficient to accommodate a 360° swing of any vessel to be serviced by the equipment.

At a suitable distance above the water level W to be unsubmerged at all times, the post or pile 14 fixedly mounts a sustaining or supporting ring 15, upon which an annular sleeve or boat spacing and coupling ring 16 rests for rotation about an upright axis represented by the pile; and the ring 16 serves a further indicator function to be described.

Sleeve 16 has a fixed or integral tubular fitting 18 extending radially outwardly therefrom, within which fitting an outwardly projecting rod 19 is telescoped. The outer end of rod 19 has a clevis 20, within the fork of which a tongue or a cushioned abutment pad 21 is received and pivotally held by a pin 22. If desired, the rod 19 may be resiliently urged outwardly in the fitting 18, motion being limited by a pin and slot connection 23 (FIG. 2); or in the alternative the rod may be adjustably threaded in the fitting.

Thus, the pad 21 may be positioned in direct abutting and spacing engagement with the adjacent side of the vessel, as shown in FIG. 3, the pivotal clevis connection at 20, 22 accommodating up and down buoyant motions of the vessel V. The connection of rod 19 to the coupling ring or sleeve 16 permits horizontal 360° swinging of the vessel (tethered as hereinafter described) about the axis of pile 14 both during the normal compensating procedure, and preliminaries thereto while the apparatus 10 is being set up for operation. The effect is that of a universal joint.

Ring 16 has an external upright indicator 24 mounted thereon for horizontal adjustment relative thereto, as by a pin or bolt taking into an arcuate slot 25 in sleeve 16, and the pointer 24 is adapted to coact with an azimuth ring 26 fixed to the pile 14 directly above the rotatable coupling ring 16. Azimuth ring 26 is calibrated directly above pointer 24 in at least terms of major compass directions, and preferably more finely.

The azimuth ring 26 functions as a fixed support from beneath for a vertical elongated, 360° rotatable frame ring 28 telescoped downwardly over the top of pile 14, this frame member supporting the remainder of the operating components of the apparatus 10.

As shown in FIGS. 1, 2 and 3, the frame ring 28 is provided at its top with a fixed, upwardly extending, U-shaped mounting bracket 30 (FIG. 3) having spaced side uprights 31 which, adjacent the bottoms thereof, provide means by which a pair of oppositely extending compensating frame arms 32, 33 are pivotally mounted to swing about a common horizontal axis, for a specific purpose to be further described.

The frame arms 32, 33 which in their operative, horizontally extending position afford a tethering and compensating frame, proper, of the apparatus, may each comprise a pair of lengths of rod or bar stock, such lengths of the respective frame arms 32, 33 being designated 34 and 35. They are rigidly united together at their opposite outer ends, as through the agency of a rigid, upright and elongated truss member 36 for each pair 34, 34 and 35, 35, which truss members are welded or otherwise suitably joined strongly between the ends of the respective members of the arms 32, 33. The frame lengths are further reinforced and stiffened by other welded means; and their trusses 36 also serve another function, as will be described.

For the purpose of pivotally connecting arms 32, 33 to the uprights 31 of frame bracket 30, reference being had to FIG. 4 in conjunction with FIGS. 1, 2 and 3, the uprights are apertured in horizontal alignment with one another to receive a pivot pin 38; and the respective arm members 34, 35 are longitudinally overlapped at their adjacent ends by means of a tongue and clevis connection 39 which receives the pivot pin 38, the latter being suitably held against accidental displacement, as by a cotter pin 40. Of course, any other adequate means for pivoting the frame arms 32, 33 to the bracket 30 are contemplated.

In order to lock the arms in the operative position of FIGS. 1 and 2, the rigid truss member 36 of each arm is provided, at its radially inner and bottom end, with an opening receivable between fork ears 42 integral with the rotative frame sleeve or ring 28, being releasably locked to these ears when the apparatus 10 is in use by means of removable pins 43.

For the purpose of enabling the thus pivoted arms 32, 33 to be swung upwardly, when the apparatus 10 is not in use, in wintertime or overnight, from the solid line operative position of FIG. 1 to the dot-dash line, inoperative retract position, the frame ring 28 horizontally journals a sprocket 45 below its bracket 30, which sprocket is adapted to be manually rotated by an external crank handle 46.

A chain 48 trains upwardly from sprocket 45 about a vertically aligned further sprocket 50, the sprocket 50 being secured to a horizontal shaft 51 journaled in the upper part of the uprights 31 of bracket 30; and a cable winding drum 52 is secured on shaft 51 between the uprights. A pair of flexible steel cables 53, 54 are each fixedly connected at one end of the drum 52, being trained in the same direction about the latter; and from such connections the cables 53, 54 respectively extend forward and aftward to anchor connections at 56 on the opposed frame arms 32, 33, shown as connections adjacent the bottoms of the truss members 36 of these arms.

Suitable releasable means, for example, a built-in reel brake or a pawl and ratchet mechanism (not shown) for the drum 52 may be employed to enable the latter to be cranked to elevate the frame arms 32, 33 (FIG. 1), then releasably locked against retrogression to hold the arms in the elevated position. In the alternative, the lock means may be incorporated in one of the sprockets 45, 50.

Accordingly, upon removal of the truss locking pins 43, the crank 46 may be operated by the owner from a central point lengthwise of vessel V to raise the arm structure 32, 33 to the retract position indicated in dot-dash line of FIG. 1, the arms being then releasably locked in that position, to compact apparatus 10 when not required for use.

Further in accordance with the invention, each of the truss-reinforced frame arms 32, 33 is provided, intermediate the horizontal length thereof, with a welded plate 58, these plates serving as further frame stiffening and reinforcing members; and cable winding drums 59, 60 are mounted on upright shafts 61 journaled by the plates 58. Each of the drums 59, 60 is manually operable by a hand crank 62 from a convenient point adjacent the elevating and lowering crank 46; and, again, suitable releasable drum locking means, for example in the form of reel brake or pawl and ratchet devices (not shown) incorporated in the drums 59, 60, enable the latter to be releasably held against retrograde motion.

A flexible steel cable 64 is secured at one end to the drum 59, extending forward about a vertically journaled pulley 65 at the outer end of the frame arm 32; and the cable 64 is adapted to be outwardly looped over and anchored at its free end to the forward or prow cleat 12 of vessel V. Similarly, a second flexible cable 66 has one end secured to the aft drum 60, being brought aft about a second, frame-journaled pulley 67, whence it may be looped at its free end over the aft cleat 13.

Accordingly, it is seen that the operator may, by manipulating hand cranks 62 of the drums 59, 60, conveniently bring the cables 64, 66 to a taut connection to cleats 12, 13, and can then lock the drums, with the cables thus taken up in such manner that the keel centerline C of vessel V exactly parallels a longitudinal centerline of the frame arms 32, 33 through the axes of the respective end pulleys 65, 67. The universal connection of the spacing abutment pad 21, as engaged with the boat side, permits these adjustments, i.e., at its clevis connection to the rod 19 and at the rotary swinging connection of that rod to the pile 14 through the agency of the coupling sleeve 16 which carried the adjustable azimuth pointer 24.

In use, and with the frame arms 32, 33 in the operative position shown in solid line in the figures, the operator brings the front and rear tethering cables 64, 66 about the respective forward and aft pulleys 65, 67, thence to a looped over, anchoring connection to the respective forward and aft cleats 12, 13, with the releasable crank or drum locks arranged to permit this operation. He then sequentially or simultaneously turns the cranks 62 to adjust the pull of cables 64, 66 until the centerline C of the craft just parallels the longitudinal frame center line through the axes of pulleys 65, 67. This can readily be done by sight from the central location at which the operator works; and the cable drums 59, 60 are then locked against retrograde motion.

Having set the engine power of the craft at "idle," the operator then adjusts the rudder (not shown) of the vessel to cause the latter to swing slowly about the axis of pile 14. This is done for the purpose of exactly aligning the centerline C (or the centerline of frame arms 32, 33, if convenient) with a known, more or less distant magnetic compass sighting point forward of the craft. Placing the rudder at far left, with forward engine power, will move the boat counterclockwise, and a reversal of rudder will move the vessel clockwise.

When true alignment of center line and sighting point is reached, it is maintained while the operator has an opportunity to adjust the pointer 24 relative to coupling ring 16, until the pointer exactly mates with the calibration on azimuth ring 26 representing the known directional line of the sighting point (indicated as "South" in FIG. 3). He then locks pointer 24 to the rotative coupling ring 16, and the apparatus is set for compensating operation, during which a slight powering of the craft with rudder set one way or the other will swing the vessel about the axis of pile 14, with its keel centerline always in true parallelism with the centerline of frame arms 32, 33. At desired compass intervals, the visual reading provided by the azimuth ring 26 and pointer 24 is referred to for comparison with that of the compass of the vessel, variations requiring correction being noted at the compass inclinations through a full 360° of swing.

In view of the nature of the operation for which the equipment 10 is employed, it is desirable that components thereof be of nonmagnetic material. Thus, aluminum or other suitably inexpensive nonmagnetic metal is indicated for the frame structure, and even nonmetallic material, such as molded plastic, may be found suitable for the parts. The ability to resist rusting is also a factor to be considered. Stainless steel may be utilized for the cables 53, 54, 64 and 66, or other appropriate alloy having necessary flexibility, wearability and strength.

The apparatus is simple and inexpensive in the extreme, enabling a single operator to make, easily and in a short time, as well as substantially unhindered by weather conditions, the needed compensating referrals. The operator can, from the same central location in the boat, not only perform the tethering and untethering operations, but also swing the frame arms, after first disconnecting the tethering cables and truss locking pins, to their inoperative elevated position, or downwardly to their horizontal position, preliminary to tethering the craft from the same location.

What I claim as my invention is:

1. Apparatus for compensating marine compasses, comprising a support member, a compensating frame member mounted by said support member to swing about an upright axis, means to tether a floating craft at two points to said frame member, with the keel line of the craft at least paralleling a longitudinal line of said frame member through said points, and coacting azimuth and indicator elements carried by said support and frame members for relative rotation about said axis when the frame member is swung, one to visually indicate a known direction in coaction with the other element, said tethering means comprising flexible cable means adapted to be releasably connected from said frame member to the craft adjacent its bow and stern, an abutment member rotatable with said rotatable element about the axis of swing of said frame member and engageable outwardly with the craft between the cable connections to the latter, and manually operable means to draw the cable means taut at said connections.

2. Apparatus for compensating marine compasses, comprising a support member, a compensating frame member mounted by said support member to swing about an upright axis, means to tether a floating craft at two points to said frame member, with the keel line of the craft at least paralleling a longitudinal line of said frame member through said points, and coacting azimuth and indicator elements carried by said support and frame members for relative rotation about said axis when the frame member is swung, one to visually indicate a known direction in coaction with the other element, said frame member having a pair of elongated, horizontally aligned arms each having a horizontal pivotal connection at an inner end thereof to said frame member, and manually operable flexible cable means connected between the respective arms and said frame member to swing the arms vertically about the pivotal arm connections.

3. Apparatus for compensating marine compasses, comprising a support member, a compensating frame member mounted by said support member to swing about an upright axis, means to tether a floating craft at two points to said frame member, with the keel line of the craft at least paralleling a longitudinal line of said frame member through said points, and coacting azimuth and indicator elements carried by said support and frame members for relative rotation about said axis when the frame member is swung, one to visually indicate a known direction in coaction with the other element, said tethering means comprising flexible cable means adapted to be releasably connected from said frame member to the craft adjacent its bow and stern, an abutment member rotatable with said rotatable element about the axis of swing of said frame member and engageable outwardly with the craft between the cable connections to the latter, and manually operable means to draw the cables taut at said connections, said frame member comprising a pair of elongated, horizontally aligned arms each having a horizontal pivotal connection at an inner end thereof to said frame member, and manually operable flexible cable means connected between the respective arms and said frame member to swing the arms vertically about the pivotal arm connections, said first named cable means being connected to said frame member arms.

4. Apparatus for compensating marine compasses, comprising a support member, a horizontally elongated compensating frame member mounted by said support member to swing about an upright axis centrally of the length of said frame member, means to tether a floating craft adjacent its bow and stern to said frame member, with the keel line of the craft at least paralleling a longitudinal centerline of said frame member, and coacting azimuth and indicator elements carried by said support and frame members for relative rotation about said axis when the frame member is swung, one of said elements being independently adjustable angularly about said axis relative to the member carrying the same to visually indicate a known direction in coaction with the other element, said tethering means comprising flexible cables adapted to be connected to the craft adjacent its bow and stern, an abutment member rotatable with said frame member about the axis of swing of said support member and engageable with the craft between the cable connections to the latter, and manually operable drum means about which said cables are trained to draw the same taut at said connections, said frame member comprising a pair of elongated, horizontally aligned arms each having a horizontal pivotal connection at an inner end thereof to said frame member, and manually operable cable and drum means connected between the respective arms and said frame member to swing the arms vertically about the pivotal arm connections, said tethering cables acting between said arms and the cable connections to the craft.

5. Apparatus for compensating marine compasses, comprising a support member, a compensating frame member mounted by said support member to swing about an upright axis, means to tether a floating craft at two points to said frame member, with the keel line of the craft at least paralleling a longitudinal line of said frame member through said points, and coacting azimuth and indicator elements carried by said support and frame members for relative rotation about said axis when the frame member is swung, one to visually indicate a known direction in coaction with the other element, said frame member having a pair of elongated, horizontally aligned arms each having a horizontal pivotal connection at an inner end thereof to said frame member, and manually operable means connected between the respective arms and said frame member to swing the arms vertically about the pivotal arm connections.

References Cited

UNITED STATES PATENTS

| | | | |
|---|---|---|---|
| 3,320,790 | 5/1967 | Gagne | 73—1 |
| 2,509,116 | 5/1950 | Wakefield | 73—1 |
| 3,120,106 | 2/1964 | Foster. | |

S. CLEMENT SWISHER, *Acting Primary Examiner.*